United States Patent [19]

McCullough et al.

[11] Patent Number: 4,878,422

[45] Date of Patent: Nov. 7, 1989

[54] UNIVERSAL CEREAL PUFFING APPARATUS

[75] Inventors: Nancy J. McCullough; Jacob E. Schukman, both of Battle Creek; Phillip G. Powers, East Leroy, all of Mich.

[73] Assignee: General Foods Corporation, White Plains, N.Y.

[21] Appl. No.: 274,232

[22] Filed: Nov. 18, 1988

[51] Int. Cl.[4] .................................................. A23L 1/18
[52] U.S. Cl. ...................................... 99/323.4; 99/471; 366/165
[58] Field of Search .................. 99/323.4, 323.7, 323.9, 99/323.11, 471, 480, 646 R; 426/445–447, 449; 366/165

[56] References Cited

U.S. PATENT DOCUMENTS

| | | | |
|---|---|---|---|
| 3,047,275 | 7/1962 | Cox | 366/165 X |
| 3,094,059 | 6/1963 | Graham et al. | 99/323.4 |
| 3,231,387 | 1/1966 | Tsuchiya et al. | 99/323.4 |
| 3,684,526 | 8/1972 | Lowery | 99/471 |
| 3,971,303 | 7/1976 | Dahl | 99/323.4 |
| 4,498,819 | 2/1985 | El-Saie | 366/165 X |

*Primary Examiner*—Timothy F. Simone
*Attorney, Agent, or Firm*—Thomas R. Savoie; Daniel J. Donovan

[57] ABSTRACT

An apparatus is provided that is suitable for puffing a variety of different cereal material such as any cereal grain or cereal doughs or extrusions. A generally frusto-conical pressurizing chamber is provided with a nozzle component at its discharge end portion, which nozzle component is interchangeable with nozzle components having differing shapes and sizes depending upon the particular cereal material to be puffed or expanded. Steam injectors are tangentally oriented with respect to the pressurizing chamber, and they cooperate to provide a generally vortex-like discharge path for the cereal material out of the pressurizing chamber.

18 Claims, 2 Drawing Sheets

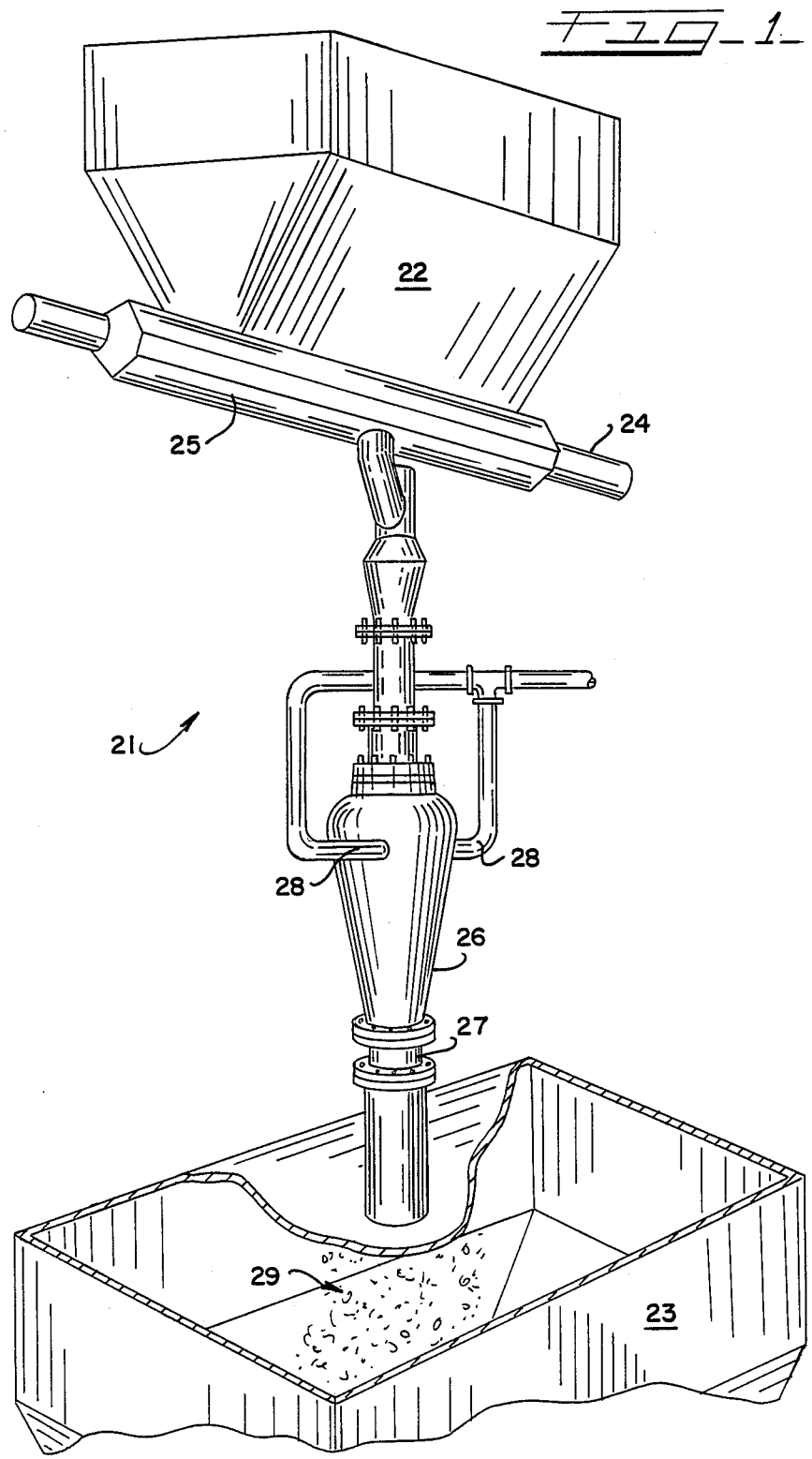

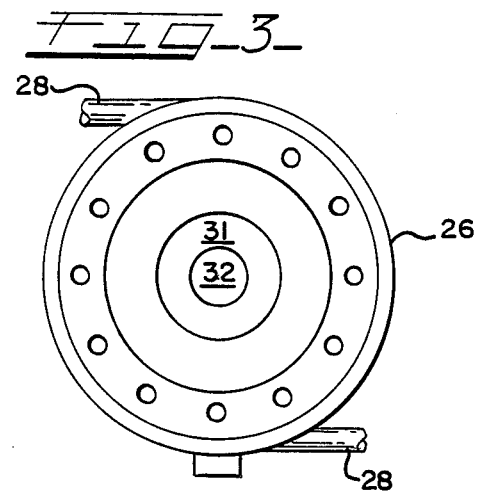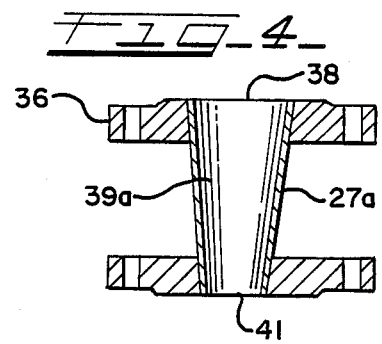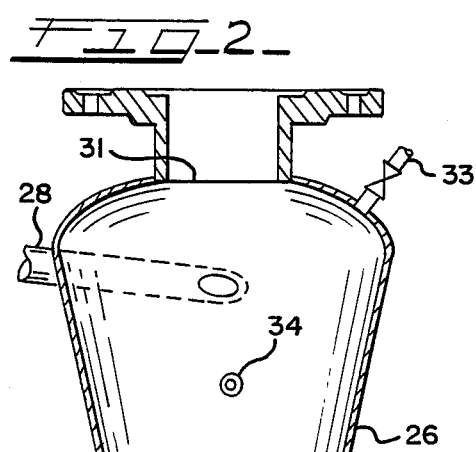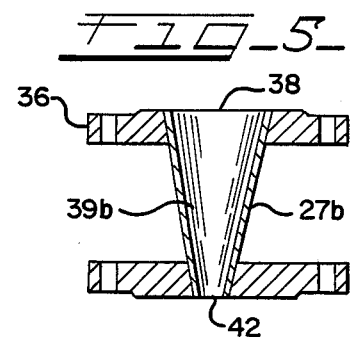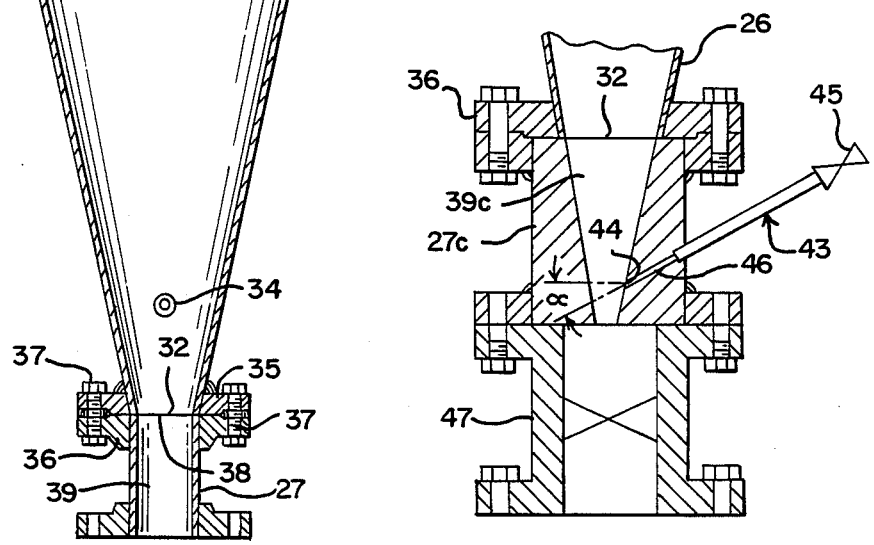

UNIVERSAL CEREAL PUFFING APPARATUS

DESCRIPTION

Background and Description of the Invention

The present invention generally relates to an apparatus for carrying out what is generally known as puffing of any of a variety of cereal grains or cereal doughs. More particularly, the invention relates to an apparatus that can be readily modified to efficiently puff cereal products with increased yields. Puffing conditions are readily modified or adjusted which enables the user to subject any one of a variety of cereal grains or cereal doughs to treatment conditions which are most advantageous or optimum for the particular cereal material. Treatment conditions that can be modified in accordance with the present include aperture size and shape of the exit or discharge nozzle, temperature, pressure, treatment time and the like. A typically vertical and generally frusto-conical pressurizing chamber opens into one of a variety of differently sized exit nozzles. Steam injector means impart a vortex flow to the cereal material during its rapid discharge from the pressurizing chamber when the exit is opened.

Gun systems or the like are currently known for use in "puffing" or rapidly expanding the volume of cereal grains or cereal doughs or extrusions. In devices of this type, the cereal material is subjected to pressure buildup and rapid pressure decrease and passage through a constriction or nozzle. Often, gun systems are designed for a particular type of cereal material. For example, generally speaking, wheat is the easiest grain to puff, and a wheat puffing gun system can have a simple gun chamber that is cylindrical in shape, with the exit orifice of the gun system being relatively small. Other traditional gun chambers may be larger or cone-shaped and may have a larger exit or discharge orifice when such a gun system is designed for puffing cereal materials having a starch content greater than wheat. A gun system which is incorrectly designed for a specified cereal material can improperly puff the cereal material, can puff the material to lower-than-desirable yields, and/or can damage the material such as by shattering the grain material or the like upon its exit from the gun system.

An example of a previously known vertical gun puffing apparatus is found in Graham et al U.S. Pat. No. 3,094,059, the subject matter thereof being incorporated by reference hereinto. In addition, attempts have been made to have a single puffing apparatus handle a multiplicity of products. Included are Tsuchiya et al U.S. Pat. No. 3,231,387. Typically, such structures are not particularly suitable for rapid vertically oriented processing of the type carried out by the present invention.

Puffable cereal materials that have been processed heretofore to a puffed state by pressurization with steam and rapid expansion through an orifice include cereal grains or granules of corn, rice, wheat and the like. Also puffable under appropriate conditions are cereal dough compositions, which are typically extruded or otherwise compacted into a desired shape such as a pellet. Usually such cereal dough compositions include one or more of the typical grain components of corn, rice, wheat or the like. Generally, such a dough composition is partly cooked or adequately preheated before it passes into the gun system, within which needed cooking is completed immediately prior to puffing. It is generally accepted that wheat is the easiest of the grains to puff, with other grains being more difficult in large degree because of the starchy nature of such grains, which often exhibit exposed starch. Accordingly, it will be appreciated that the various grain materials present differing handling problems.

The present invention retains substantially all of the advantages of gun systems that are specifically designed for a particular type of cereal material while providing a single universal type of puffing gun system that can process substantially any cereal material by combining adjustability features with other attributes of the system in order to facilitate successful handling of a wide variety of cereal grains or cereal doughs or extrusions. The invention can accommodate the differing handling problems presented by various cereal materials. In summary, the present invention includes a generally frusto-conically shaped pressurizing chamber having interchangeable exit nozzle means through which the cereal material rapidly passes during the puffing operation. The pressurizing chamber further includes steam injector means for introducing a substantially tangential flow of pressurizing and heating steam which develops a vortex-like action for the cereal material when it exits from the pressurizing chamber.

It is a general object of the present invention to provide a preferred apparatus and method for puffing cereal material.

Another object of the present invention is to provide an improved cereal puffing or expanding apparatus and method which are capable of processing a variety of cereal grains and cereal doughs in an efficient manner.

Another object of this invention is to provide an improved cereal puffing apparatus and method which impart a vortex-like action to the cereal material during its puffing discharge pathway.

Another object of the present invention is to provide an improved cereal puffing or expanding apparatus and method that effect an especially rapid and effective discharge without substantial shattering of the puffed cereal products.

Another object of the present invention is to provide an improved apparatus and method whereby any of corn, rice and/or wheat grains or doughs may be puffed on the same piece of equipment with only minor modifications that are made in a relatively short time period.

Another object of the present invention is to provide an improved cereal puffing apparatus and method in which variations in temperature and pressure within the pressurizing chamber are substantially eliminated.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 1 is a perspective view generally illustrating in a somewhat schematic manner an apparatus according to this invention;

FIG. 2 is a longitudinal cross-sectional view through a typical pressurizing chamber according to the invention including one form of an interchangeable nozzle component;

FIG. 3 is a top plan view of the chamber illustrated in FIG. 2;

FIG. 4 is a longitudinal cross-sectional view of a further embodiment of an interchangeable nozzle component of the pressurizing chamber;

FIG. 5 is a longitudinal cross-sectional view of another interchangeable nozzle component; and FIG. 6 is a partially schematic longitudinal cross-sectional view showing an assembly of a further nozzle component in association with a discharge valve.

DESCRIPTION OF THE PARTICULAR EMBODIMENTS

A universal type of puffing apparatus is generally designated as 21 in FIG. 1. Puffing apparatus 21 is associated with a surge hopper 22 for supplying cereal material into the puffing apparatus 21 and with an expansion or explosion chamber 23 which receives the cereal material after it is treated within the puffing apparatus 21. Heated air or the like is imparted to the cereal material downstream of the surge hopper 22, such as through ductwork 24 in order to preheat the cereal material within a suitable preheater which is somewhat schematically illustrated at 25.

With more particular reference to the universal puffing apparatus 21, the illustrated apparatus includes a generally vertically oriented pressurizing chamber 26 and an interchangeable nozzle component 27. One or more, preferably two, steam injectors 28 open into the upper portion of the pressurizing chamber 26. Each steam injector 28 is substantially tangentially oriented with respect to a generally horizontal cross-section of the pressurizing chamber. Each steam injector 28 also can be slightly downwardly directed as shown in FIG. 2 so that the tangental flow therefrom also has a directional component that is toward the exit, or downwardly as shown.

When in operation, cereal material within the surge hopper 22 drops into the pressurizing chamber 26, typically after a charge thereof has been heated in the preheater 25. Pressurized steam is tangentially injected into the cereal material charge within the pressurizing chamber 26. After desired puffing temperature and pressure conditions are reached, the cereal material is allowed to rapidly pass out of the pressurizing chamber 26 in order to deposit puffed cereal material 29 into the expansion or explosion chamber 23.

Referring to FIGS. 2 and 3, the preferred pressurizing chamber 26 has tapering sidewalls and a generally frusto-conical shape. Pressurizing chamber 26 includes an inlet end portion having a mouth 31 as well as an outlet end portion having a discharge opening 32. The tangentally oriented steam injectors 29 are generally located within the inlet end portion, typically below the mouth 31. A bleed valve 33 is positioned through the wall of the pressurizing chamber 26, preferably also in the inlet end portion thereof as illustrated. Bleed valve 33 can be used to signal when a desired pressure has been built up within the pressurizing chamber 26. Thermocouples can be positioned within thermocouple ports 34 for purpose of monitoring the temperature within the pressurizing chamber 26. Preferably, the thermocouples are positioned in more than one location in order to provide means for monitoring any possible temperature differential within the pressurizing chamber 26.

It will be noted that the interchangeable nozzle component 27 is secured to the bottom end of the pressurizing chamber 26 by suitable means such as the illustrated opposing flanges 35, 36 and bolts 37. In addition, nozzle component 27 has a transition interface opening 38 that is sized and shaped so as to be substantially the same as the size and shape of the discharge opening 32. With this arrangement, there is no internal lip or shelf, which could present a location for starch buildup or for damage to cereal material exiting from the pressurizing chamber 26. The interchangeable nozzle component 27 that is illustrated in FIG. 2 has a throat or nozzle passageway 39 which provides a substantially uniform passageway for the cereal material exiting from the puffing apparatus. This affords a relatively wide passageway which can be particularly advantageous for difficult to handle cereal materials such as extruded pellets or the like.

Concerning FIG. 4, another interchangeable nozzle component 27a is shown. This component can, when desired, be substituted for the nozzle component 27 illustrated in FIG. 2. Interchangeable nozzle component 27a has a transition interface opening 38 which is substantially the same size and shape as the transition interface opening 38 of the interchangeable nozzle component 27. Interchangeable nozzle component 27a has a discharge orifice 41 which is of a size that is reduced relative to the transition interface opening 38. Sidewall or nozzle passageway 39a tapers downwardly between the size of the transition interface opening 38 and the size of the discharge orifice 41. For example, opening 38 can have a diameter of on the order of about 3 inches, whereas discharge orifice 41 can have a diameter of about one half of that size. Interchangeable nozzle component 27a would be useful for puffing or expanding starchy cereal grains including those having exposed starch, such as corn, rice or the like Interchangeable nozzle component 27b shown in FIG. 5 is similar to component 27a shown in FIG. 4, except the discharge orifice 42 thereof is even narrower than discharge orifice 41. Correspondingly, the nozzle passageway 39b has a taper which is greater than that of nozzle passageway 39a. For example, the diameter of discharge orifice 42 can be one quarter or less than that of the transition interface opening 38, a typical diameter in this regard being on the order of ¾ inch, inch, or the like. This narrowly tapering structure would be particularly suitable for wheat grains or for corn or rice or the like which is not particularly high in starch content, especially exposed starch content.

With reference to FIG. 6, another interchangeable nozzle component 27c is illustrated. This nozzle component includes a supplemental steam injector or bleeder assembly 43 which can be provided primarily for the purpose of providing an additional supply of pressurizing and temperature-raising steam into the bottom area of the pressurizing chamber 26 in order to thereby assist in minimizing or eliminating any pressure gradient and/or temperature gradient within the pressurizing chamber 26 so as to aid in equilibration of conditions therewithin. Supplemental steam bleeder or injector assembly 43 includes an orifice 44 opening into nozzle passageway 39c, as well as other suitable gas transmission means, such as steam conduits and a bleed valve 45. It is preferred that the orifice 44 is located within the nozzle passageway 39c such that the axis of its bore 46 enters the nozzle passageway 39c at an acute angle $\alpha$ with the horizontal plane as illustrated in FIG. 6. With such an arrangement, there is a substantial reduction in any likelihood that cereal material or starch will build up at or within the orifice 44 or the bore 46. If desired, the supplemental steam injector assembly 43 can be positioned along the outlet end portion of the pressurizing chamber 26.

A suitable arrangement is typically provided in order to maintain the cereal material and steam within the pressurizing chamber 26 until the desired pressure and temperature conditions are attained. An example of such a structure is a sealing obstruction such as a valve 47. A preferred type of valve 47 is one that is a full ported ball valve. Whatever particular valve is used, it is preferred that it provides a substantially open and unobstructed passageway which may, for example, be of substantially the same size and shape as the discharge opening 32 of the pressurizing chamber 26. Otherwise, the valve could be the source of undesirable shattering of the cereal material as it passes therethrough during its exit from the pressurizing chamber 26.

Preferably, the present apparatus is operated on a substantially batch basis wherein a pre-measured charge of cereal material is preheated and introduced into the pressurizing chamber 26. Then, steam enters the system through the steam injectors 28 until a predetermined pressure and temperature is achieved, which is often monitored at least in part by the provision of a bleed valve such as the bleed valve 33. At this stage, and after the conclusion of any desired cooking time which is usually on the order of a few seconds, the sealing obstruction such as valve 47 which is provided at the downstream end portion of the puffing apparatus 21 is opened, and the cereal material is discharged as puffed cereal material 29.

In an advantageous optional embodiment, a steam boost cycle may be interposed immediately prior to removal of the bottom end portion sealing obstruction, such as opening valve 47. For example, a typical processing pressure would be on the order of 150 psi gauge or above, and a typical steam boost just prior to discharge would add additional steam so as to increase the pressure within the pressurizing chamber by up to about 50 psi or above. This pressure boost procedure is particularly useful when the cereal material being run exhibits a high starch content, which might be characteristic of cracked corn in which the starch can be observed as a powdery residue. Generally speaking, such a pressure boost would be carried out during only the last second or so of the process prior to removal of the bottom end obstruction to effect a "shot" of the puffing "gun," with the pressure boost being generally on the order of an increase of approximately one third of the pressure in the pressurizing chamber 26 prior to the implementation of such a boost. A comparison of a typical cycle for the apparatus both with and without the pressure boost feature is particularly advantageous in that the pressure boost substantially eliminates what has been experienced as a discharge pressure differential that occurs generally at the time of discharge in puffing devices. A typical discharge pressure differential is on the order of 15 psi gauge, or a reduction that approximates 10 percent. It is believed that this discharge pressure differential causes a reduction in yield, which reduction would be eliminated by the pressure boost feature.

Cereal materials were processed according to the present invention in order to illustrate the versatility and advantageous features of this invention. Details in this regard are provided in the following examples.

EXAMPLE 1

A puffing apparatus of the type generally described herein was assembled to include a nozzle component secured to the bottom flange of the pressurizing chamber. A full ported valve was positioned beneath the nozzle component, and the nozzle component had a generally frusto-conical nozzle passageway tapering from a 3-inch diameter to a diameter of ¾ inch. The run was made on production sized equipment, and a full sized shot of wheat was filled into the pressurizing chamber, with the valve being closed. The wheat was pressurized with steam. The dry basis yield of wheat that was puffed to meet commercial production specifications on a dry weight basis was between 85 percent and 91 percent. Satisfactory runs were also conducted on wheat charges with a configuration in which the valve was positioned upstream of the nozzle component.

EXAMPLE 2

Corn grain was charged into the assembly discussed in Example 1 where the valve was downstream of the nozzle component. The nozzle component was changed to one having a less pronounced taper, the particular nozzle component tapering from 3 inches to 1½ inch. A 50 psi gauge pressure boost was carried out in the last second prior to discharge by opening the valve, this boost being provided to eliminate a 15 psi discharge pressure differential that was otherwise observed upon initial opening of the valve. The dry yield of puffed corn was between 86 percent and 91 percent by weight, when measured on commercial production grading devices for puffed wheat.

EXAMPLE 3

Production-sized batches of rice were charged into a puffing apparatus having the discharge valve downstream of a nozzle component having a frusto-conical nozzle passageway with an upper diameter of 3 inches narrowing to 1½ inch. A pressure charge of 165 psi gauge was maintained for 30 seconds. This pressure charge was ramped up to 208 psi gauge for 7 seconds, and then the valve was opened and the batch was discharged into the expansion or explosion chamber. The dry yield of puffed rice was approximately 94 percent to 96 percent by weight, when using a puffed wheat commercial production screening device.

EXAMPLE 4

Wheat was charged into a conventional wheat puffing apparatus not in accordance with the present invention. Sixteen batches of substantially equal weight charges of wheat were processed therethrough. The dry weight of puffed wheat meeting production standards for commercial products were determined. The dry weight values thus determined were as follows: 55.4 lbs., 60.4 lbs., 60.8 lbs., 61.8 lbs., 62.0 lbs., 64.0 lbs., 59.0 lbs., 62.0 lbs., 62.0 lbs., 62.0 lbs., 61.6 lbs., 62.2 lbs., 61.8 lbs., 58.8 lbs., 62.0 lbs. and 67.2 lbs. The highest and lowest values were discarded, and the average yield of acceptably puffed wheat was calculated as 61.45 lbs. The standard deviation was determined to be 0.92.

Another 16 batches of wheat were processed in a puffing apparatus in accordance with this invention, the apparatus including a nozzle component having a frusto-conical nozzle passageway having an upper end opening diameter of 3 inches and a bottom end exit opening diameter of ⅝ inch. The dry weight yields for these batches were as follows: 52.4 lbs., 61.8 lbs., 62.8 lbs., 63.0 lbs., 63.4 lbs., 63.0 lbs., 63.0 lbs., 63.4 lbs., 63.2 lbs., 63.0 lbs., 63.6 lbs., 62.8 lbs., 62.6 lbs., 66.2 lbs., 63.1 lbs. and 63.1 lbs. (the last two values being an average of a combined dry weight measurement). Again, the highest and lowest values were discarded. The average dry basis yield was calculated as 62.985 lbs. for these 14 samples, and the standard deviation was determined to be 0.43.

When comparing the runs made in accordance with the present invention versus those made according to the prior art, the average increase experienced according to the present invention was 1.54 lbs. per batch. This represents a yield increase that is in excess of 2 weight percent. In addition, the lower standard deviation for the system in accordance with the present invention signifies greater yield consistency from batch to batch.

EXAMPLE 5

A batch of approximately 73 lbs. of wheat was charged into a puffing apparatus having the valve between the pressurizing chamber and a frusto-conical nozzle component tapering from a 3-inch diameter to a ⅜-inch diameter. Satisfactory puffing occurred, with 11.11 percent of the puffed wheat remaining on a ⅜-inch screen, 71.41 percent remaining on a ¼-inch screen, and 15.45 percent remaining on a 6 mesh screen.

EXAMPLE 6

Another batch of wheat was run much in the manner of Example 5, except the discharge valve was positioned downstream of the nozzle component. 14.75 percent of the thus puffed wheat remained on the ⅜-inch screen and 76.40 percent remained on the ¼- inch screen.

Another wheat batch was run on a puffing apparatus in accordance with the present invention which included a boost or ramp up of inlet steam just prior to discharge. The resulting puffed wheat was screened, with 14.53 percent thereof remaining on the ⅜-inch screen, 74.37 percent remaining on the ¼-inch screen, and 9.22 percent remaining on the 6 mesh screen.

EXAMPLE 7

Another wheat batch was run on an apparatus according to the present invention. 13.74 percent of the puffed wheat thus formed remained on the ⅜-inch screen, 81.07 percent remained on the ¼-inch screen, and 4.67 percent remained on the 6 mesh screen.

EXAMPLE 8

A puffing apparatus in accordance with the present invention was assembled with a nozzle component having a top end diameter of 3 inches and a discharge end opening diameter of 1½ inch. One batch of corn was run therethrough, and 16.14 percent of the thus puffed corn remained on the ⅜-inch screen, 70.44 percent remained on the ¼-inch screen and 11.95 remained on the 6 mesh screen. Another batch of corn was puffed, and 19.07 percent thereof remained on the ⅜-inch screen, 72.80 percent remained on the ¼-inch screen, and 6.63 percent remained on the 6 mesh screen.

EXAMPLE 9

A 50 pound shot of rice was run on an apparatus according to the present invention having a nozzle component with a frusto-conical passageway tapering from 3 inches down to a discharge orifice of 1½ inch. 63.63 percent thereof remained on a 4 mesh screen, 30.32 percent remained on an ASTM 4 mesh screen, and 4.22 percent remained on an ASTM 6 mesh screen. A 73 pound shot of rice was run through this apparatus, and 70.60 percent thereof remained on the 4 mesh screen, 25.85 percent remained on the ASTM 4 mesh screen, and 2.47 percent remained on the ASTM 6 mesh screen.

It will be understood that the embodiments of the present invention which have been described are illustrative of some of the applications of the principles of the present invention. Numerous modifications may be made by those skilled in the art without departing from the true spirit and scope of the invention.

We claim:

1. A cereal puffing apparatus for puffing a variety of different cereal grains or other cereal material, comprising:
   chamber means for enclosing and pressurizing a supply of cereal material therewithin, said chamber means having a cereal material inlet end portion and a cereal material outlet end portion, said chamber means having a generally frusto-conical shape that narrows generally between said inlet end portion and said outlet end portion;
   nozzle component means for receiving and directing cereal material exiting from said chamber means, said nozzle component means being interchangeably secured to said apparatus at a location downstream of said chamber means; and
   steam injector means for introducing a flow of steam into said chamber means, said steam injector means generally opening into said inlet end portion of the chamber means, and said steam injector means o providing a substantially tangental flow of steam into said chamber means.

2. The cereal puffing apparatus according to claim 1, wherein said chamber means is substantially vertically oriented, and said nozzle component is below said chamber means.

3. The cereal puffing apparatus according to claim 1, wherein said steam injector means tangental flow has a directional component toward said outlet end portion of the chamber means.

4. The cereal puffing apparatus according to claim 1, wherein said steam injector means is for developing a vortex-like discharge path for said cereal material which is generally directed toward said outlet end portion of the chamber means.

5. The cereal puffing apparatus according to claim 1, wherein said nozzle component means has an internal nozzle passageway that is generally frusto-conical in shape which tapers downwardly in the downstream direction.

6. The cereal puffing apparatus according to claim 1, wherein said nozzle component means has a nozzle passageway that has a substantially uniform transverse cross-sectional area throughout its length.

7. The cereal puffing apparatus according to claim 1, wherein said steam injector means includes a pair of steam injectors that are generally oppositely positioned on said chamber means.

8. The cereal puffing apparatus according to claim 1, further including a discharge valve positioned downstream of said material outlet end portion of the chamber means.

9. The cereal puffing apparatus according to claim 1, further including a supplemental steam injector assembly for injecting steam at a location proximate to the outlet end portion of the chamber means.

10. The cereal puffing apparatus according to claim 9, wherein said supplemental steam injector assembly is in said nozzle component means.

11. The cereal puffing apparatus according to claim 9, wherein said supplemental steam injector opens into the outlet end portion of the chamber means.

12. The cereal puffing apparatus according to claim 9, wherein said supplemental steam injector has an exit orifice which directs steam therethrough with an orientation having a directional component toward the discharge end of the apparatus.

13. The cereal puffing apparatus according to claim 1, further including steam pressure enhancement means for increasing pressure within the pressurizing chamber means at a time shortly prior to discharge of the cereal material from the pressurizing chamber means.

14. A cereal puffing apparatus for puffing a variety of different cereal grains or other cereal material, comprising:
   substantially vertically oriented chamber means for enclosing and pressurizing a supply of cereal material therewithin, said chamber means having a cereal material inlet end portion and a cereal material outlet end portion, said chamber means having a generally frusto-conical shape that narrows generally between said inlet end portion and said outlet end portion;
   nozzle component means for receiving and directing cereal material exiting from said chamber means, said nozzle component means being interchangeably secured to said apparatus at a location below said chamber means; and
   steam injector means for introducing a flow of steam into said chamber means, said steam injector means generally opening into said inlet end portion of the chamber means, and said steam injector means being for providing a substantially tangental flow of steam into said chamber means and developing a vortex-like generally downwardly directed discharge path for said cereal material.

15. The cereal puffing apparatus according to claim 14, wherein said steam injector means tangental flow has a directional component toward said outlet end portion of the chamber means.

16. The cereal puffing apparatus according to claim 14, wherein said nozzle component means as an internal nozzle passageway that is generally frusto-conical in shape which tapers downwardly in the downstream direction.

17. The cereal puffing apparatus according to claim 14, wherein said nozzle component means has a nozzle passageway that has a substantially uniform transverse cross-sectional area throughout its length.

18. The cereal puffing apparatus according to claim 14, further including a supplemental steam injector assembly for injecting steam at a location proximate to the outlet end portion of the chamber means.

* * * * *